(12) United States Patent
Santoro (10) Patent No.: US 8,367,195 B2
(45) Date of Patent: Feb. 5, 2013

(54) PRODUCTS MADE FROM RECYCLED CARDBOARD

(76) Inventor: Frank Santoro, Flora Vista, NM (US)

( * ) Notice: Subject to any disclaimer, the term of this patent is extended or adjusted under 35 U.S.C. 154(b) by 86 days.

(21) Appl. No.: 12/554,191

(22) Filed: Sep. 4, 2009

(65) Prior Publication Data

US 2010/0115875 A1    May 13, 2010

Related U.S. Application Data

(60) Provisional application No. 61/094,223, filed on Sep. 4, 2008.

(51) Int. Cl.
*B32B 21/06* (2006.01)
*B32B 29/00* (2006.01)

(52) U.S. Cl. ......... 428/292.7; 428/26; 428/15; 428/326; 428/491; 52/782.1; 52/745.05

(58) Field of Classification Search .......... 428/323, 428/292.4, 292.1, 116–118, 131–138, 304.4, 428/304.9, 903, 357, 359, 361, 372, 402, 428/707, 378–379, 373, 404, 537.7, 375, 428/15–27, 326, 292.7, 313.7, 299.1, 327, 428/489–491, 498, 503, 526–530, 507, 537.5; 264/333, 299, 257, 294, 301, 306, 113–123, 264/320, 54; 106/801, 811, 606–607, 618–619, 106/634–635, 718–720, 677, 697, 795, 823, 106/778–783; 52/309.1–309.17, 503–505, 52/596, 604, DIG. 9, 782.1, 745.05
See application file for complete search history.

(56) References Cited

U.S. PATENT DOCUMENTS

| | | | | |
|---|---|---|---|---|
| 1,951,344 A * | 3/1934 | Caldwell | ............ | 264/42 |
| 2,017,402 A * | 10/1935 | Komarek et al. | ............... | 44/554 |
| 2,272,144 A * | 2/1942 | Allen | ............ | 428/213 |
| 2,286,963 A * | 6/1942 | Houser et al. | ............ | 106/33 |
| 2,500,866 A * | 3/1950 | Ramsay | ............ | 264/426 |
| 2,550,371 A * | 4/1951 | Naps et al. | ............ | 524/60 |
| 2,780,607 A * | 2/1957 | Rappleyea | ............ | 536/123.1 |
| 2,805,990 A * | 9/1957 | Bergman | ............ | 507/106 |
| 2,924,279 A * | 2/1960 | Hofbauer et al. | ............ | 169/44 |
| 2,967,153 A * | 1/1961 | Houston | ............ | 252/194 |
| 3,276,906 A * | 10/1966 | Nielsen | ............ | 427/385.5 |
| 3,705,838 A * | 12/1972 | Olton | ............ | 428/454 |
| 3,949,036 A | 4/1976 | Nelson | | |
| 4,111,730 A | 9/1978 | Balatinecz et al. | | |
| 4,148,952 A | 4/1979 | Nelson et al. | | |
| 4,300,322 A | 11/1981 | Clark | | |
| 4,311,554 A | 1/1982 | Herr | | |
| 4,595,414 A | 6/1986 | Shutt | | |
| 4,994,113 A | 2/1991 | Helmstetter | | |
| 5,194,206 A | 3/1993 | Koch et al. | | |
| 5,241,795 A | 9/1993 | Giroux et al. | | |
| 5,342,566 A | 8/1994 | Schafer et al. | | |
| 5,350,451 A | 9/1994 | Patterson | | |
| 5,516,472 A | 5/1996 | Laver | | |
| 5,611,882 A | 3/1997 | Riebel et al. | | |
| 5,724,783 A | 3/1998 | Mandish | | |
| 5,749,199 A | 5/1998 | Allen | | |
| 6,044,604 A * | 4/2000 | Clayton et al. | ............... | 52/309.9 |
| 6,086,998 A | 7/2000 | Wihsmann et al. | | |
| 6,319,312 B1 * | 11/2001 | Luongo | ............ | 106/675 |
| 6,322,737 B1 | 11/2001 | Beyer | | |
| 6,379,594 B1 | 4/2002 | Dopfner et al. | | |

(Continued)

*Primary Examiner* — Jeanette E. Chapman
(74) *Attorney, Agent, or Firm* — Jeffrey D. Myers; Samantha A. Updegraff; Peacock Myers, P.C.

(57) ABSTRACT

A method of making a structural component (and such a structural component) comprising mixing together wood pulp, water, bentonite clay, and calcium chloride and forming the mixture into the structural component.

11 Claims, 6 Drawing Sheets

U.S. PATENT DOCUMENTS

| | | | |
|---|---|---|---|
| 6,559,243 B1* | 5/2003 | Heinzman et al. | 525/398 |
| 6,730,160 B2 | 5/2004 | Barbosa | |
| 6,852,386 B2 | 2/2005 | Nadezhdin et al. | |
| 7,074,918 B2 | 7/2006 | Medoff et al. | |
| 7,408,056 B2 | 8/2008 | Medoff | |
| 7,470,463 B2 | 12/2008 | Medoff et al. | |
| 7,780,762 B2* | 8/2010 | Blondel et al. | 95/90 |
| 2004/0083645 A1* | 5/2004 | Riccardi | 47/1.1 |
| 2005/0210788 A1* | 9/2005 | Giles et al. | 52/309.1 |
| 2005/0241533 A1 | 11/2005 | Murakami et al. | |
| 2005/0275138 A1 | 12/2005 | Rosen | |
| 2006/0130710 A1 | 6/2006 | Murakami et al. | |
| 2007/0023118 A1* | 2/2007 | Spielvogel | 156/46 |
| 2008/0308968 A1 | 12/2008 | Immordino, Jr. | |
| 2008/0314296 A1 | 12/2008 | Wisenbaker, Jr. et al. | |
| 2009/0085253 A1 | 4/2009 | Kruss | |

* cited by examiner

PRODUCTS MADE FROM RECYCLED CARDBOARD

CROSS-REFERENCE TO RELATED APPLICATIONS

This application claims priority to and the benefit of the filing of U.S. Provisional Patent Application Ser. No. 61/094,223, entitled "Products Made from Recycled Cardboard", filed on Sep. 4, 2009, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and products for use in the building trades, which methods and products utilized recycled paper waste, including recycled cardboard, for use in making building structural and wall materials.

2. Description of Related Art

It is necessary that recycling of waste be expanded in our society beyond what is currently done, for many obvious reasons. In one preferred method of recycling, waste materials can be reprocessed and used to produce new products.

There is a need for technologically simple methods to produce building material utilizing recycled waste and particularly recycled paper waste. The prior art methods disclosed in U.S. Pat. Nos. 5,102,596, 5,302,331, 5,729,936 and 6,216,967, incorporated herein by reference, each disclose methods and products, but each method suffers from significant limitations, requires complex processing steps, or the like.

BRIEF SUMMARY OF THE INVENTION

The present invention is of a method of making a structural component (and such a structural component), comprising: mixing together wood pulp, water, bentonite clay, and calcium chloride; and forming the mixture into the structural component. In an embodiment, the mixture consists essentially of wood pulp, water, bentonite clay, and calcium chloride. In another embodiment, the mixture consists of wood pulp, water, bentonite clay, and calcium chloride. Forming can comprise employing a wire screen, rebar, and/or interlocking blocks. In a further embodiment, the mixture additionally comprises one or both of borax and boric acid. In another embodiment, the mixture consists essentially of wood pulp, water, borax or boric acid, bentonite clay, and calcium chloride. Bentonite clay preferably comprises about 10% of the structural component by volume. Calcium chloride preferably comprises about 10% of the structural component by volume. In addition, plastic waste (or other, preferably non-hazardous, waste, preferably shredded) can be incorporated as a strand reinforcement for structural components of the invention.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Paper and cardboard products are one example of materials that can be reprocessed in used to make new products. This can be done, according to this invention, with a minimum of specialized equipment. In one embodiment, cardboard waste from a paper or cardboard plant may be employed. This waste is called "press cake" in the industry, and is gathered after the processing of used cardboard boxes that have been brought to the mill for recycling. This press cake is typically loaded onto a waste transport vehicle and hauled to a landfill and buried. Cardboard not rejected, and thus not forming press cake, is typically used again in manufacturing cardboard boxes. The reject material or press case contains a large percentage of paper elements, but also includes other elements, such as plastic, tape glue, strands, etc. The press cake is thus typically a mixed waste, though consisting primarily of paper and paper products. The press cake may be employed in this invention, providing that the materials other than paper and paper products do not interfere with subsequent processing and manufacturing steps.

Press cake if received from a paper or cardboard mill is typically saturated with water from processing. The actual cake is typically approximately 1 to 2 inches wide by 2 to 3 or 4 inches long by ¼ to 1 inch thick. However, the size will vary, and sometimes is in the general size and shape of a wood type "chip" used in landscaping, and sometimes is a much larger "patty".

Utilizing the methods of this invention, the press cake is processed further by soaking it in water and mixing with various chemicals. In one embodiment, the water-soaked press cake is mixed with a variety of reagents, including borax or boric acid, which serves as a flame retardant, with bentonite clay, which serves in part as a bonding agent, and with calcium chloride, which adds strength to the mixture. The specific chemicals used and the amounts or quantities can vary depending on the composition of the press cake or other waste paper source, the desired reaction or reactions, and the specific uses to which the resulting building material will be put.

While this invention may be employed with material that is convenient and readily available, such as press cake obtained from a paper mill, the processes and methods can also be employed with recycled paper or cardboard obtained from any source.

Once the mixture of cardboard and reagents is at the desired consistency, the resulting slurry can then be poured into a mold forming either a "block", tip-up wall section, or any other of a number of shapes and sizes required or requested. After initial setting, the resulting product may optionally be removed from its mold to facilitate drying. Utilizing this method, either no pressure or very low pressure is used to compress or form the block.

In one embodiment, the form has a wire screen on one side, which supports the block and allows air circulation thereunder to facilitate drying. The wire screen may also be employed as a permanent component, to increase adhesion of subsequent plaster coats. In yet another embodiment, the form itself may be composed of a wire screen or other air and water permeable material.

A "slab" or wall section intended for use as a wall product, depending on the desired application, may optionally include a frame as a permanent part of the slab, to aid in installation or provide additional strength. The frame may be built of wood, metal, plastic or any other material with the required structural strength.

Beside use in the building trades, the resulting material can be shaped into any of a wide variety of forms for other uses, such as for example shaping into forms for use as a protective shipping cover for products, or to restrain and cushion fragile items in shipping containers or cartons.

In one embodiment, larger size blocks in various sizes and shapes are made, thereby reducing both the amount required for a project and the need for handling, and thus resulting in lower costs of labor. The blocks may be designed in different ways depending on the application; in some applications an interlocking system is employed, wherein the blocks interlock one with another. In another application blocks with a continuous cavity or cells are provided, for use as a permanent formwork for concrete or other structural materials. The blocks may also be solid. The blocks may form a part of a formwork, for forming a permanent insulated concrete form, which may employ metal or other retaining or strengthening members, such as Polysteel® forms. In such forms the paper-based material of this invention is used instead of styrofoam or other expanded plastics or foams. The blocks are structural and load-bearing, with or without concrete inside the blocks, and whether installed inside a building or on the exterior.

Wall units may be created using slab, with the slurry mixed and then poured into various size forms to accommodate its individual application. Once dried, the wall unit can then be removed from its form, and optionally cut to fit as necessary. Using the method and processes of this invention, it is possible to produce wall units of various thicknesses, shapes and sizes. In one embodiment, the form employed as a mold forms a integral and permanent part of the resulting product, and may be optionally installed utilizing clips or other fasteners designed specifically for the wall unit (preferably an interior tip-up wall).

The resulting products will advantageously be insulating, having a high R-value, thereby resulting in lower overall energy bills, increased warmth in winter and enhanced cooling in summer). In certain embodiments, the material further has a U-value, and retains and transfers heat energy as a function of time. The resulting products will similarly be lightweight, and thus easy to handle, capable of being produced in larger sizes, and easily used in building projects. The resulting products will similarly be inexpensive. The material will result in decreased costs of building, since the insulation is integral to the product. No sheet rock or other wall covering is required on internal surfaces, since the resulting surface can be directly plastered, or alternatively may be painted, using a primer as appropriate. On external walls, stucco or other typical exterior wall covering material can be applied directly to the material, thus eliminating otherwise necessary steps and additional labor. The products can be cut with ordinary tools, such as saws, known to the construction trade. The product can also be shaped, grooved to allow for other installation needs, and otherwise formed as required.

In one example, press cake was added to water in a five-gallon container. Between 1½ and 2½ gallons of water was utilized, with the balance being cardboard waste, such as press cake, to a total volume of about four gallons. To this was added up to two quart of 94% anhydrous calcium chloride, as a free flowing powder. Up to two quarts of bentonite, sold under the trade name Aquagel by Baroid Drilling Fluids, was added. Optionally a fire retardant, such as borax or boric acid, can be added, and flammability tests have been very positive. An insect repellant may also be added. The resulting contents are mixed, thereby forming a slurry, and poured into a form.

FIGS. 1-10 illustrate embodiments of the invention, including methods and mechanisms for using products made by the described methods of the invention.

Figure 1:
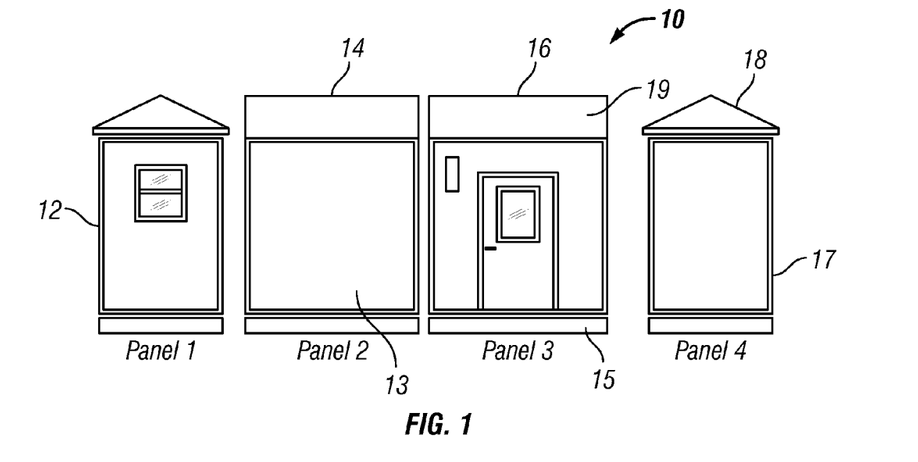
FIG. 1 is a schematic diagram of components according to the invention used to make a shed.

FIG. 1 is a schematic diagram of components according to the invention used to make a shed 10. The shed is preferably about 5'×8'×8' high, and comprises panels 12,14,16,18. Stucco finish outer walls 13 are employed, with plaster preferably to be applied for interior wall finish. Floor joists 15 are preferably 2'×10' with ¾" plywood flooring. Walls are preferably molded using 2'×4's 17 as a frame with rebar and/or wire mesh for wall reinforcement. Roofing 19 is preferably rafter type with asphalt shingles.

Figure 2:
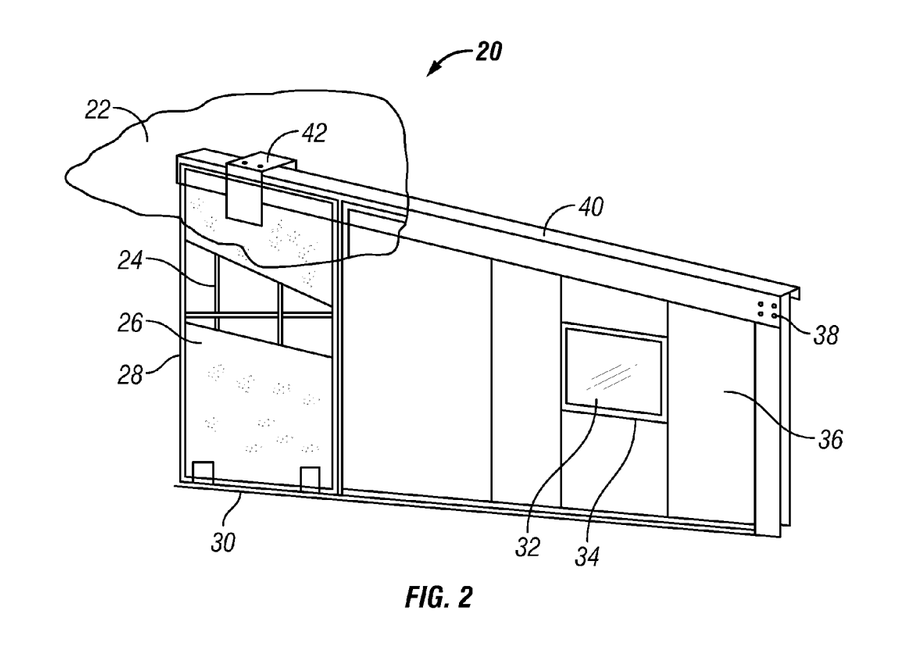
FIG. 2 is a schematic diagram of components according to the invention used to make a wall.
Figure 3A:
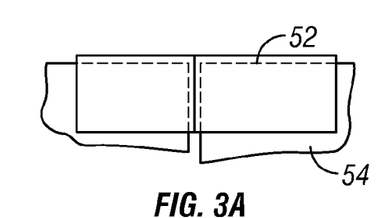
FIGS. 3(a) to (e) are views of components according to the invention attached via clips.
Figure 3B:
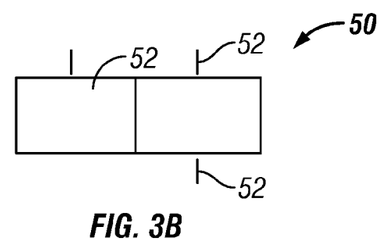
Figure 3C:
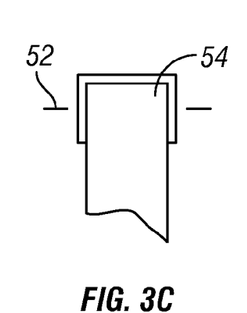
Figure 3D:
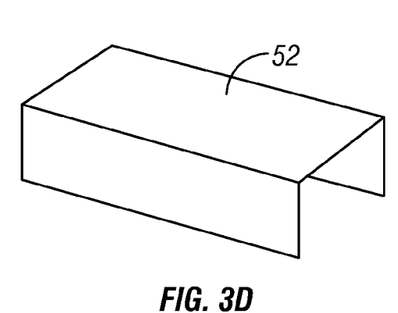
Figure 3E:
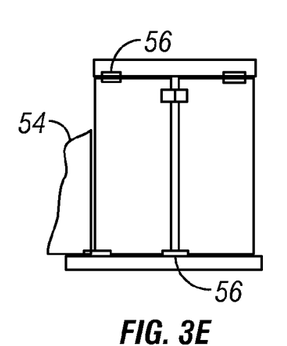

FIG. 2 is a schematic diagram of components according to the invention used to make a wall 20, with cutaway view 22. The wall comprises rebar 24 in frame 28. The frame is preferably 2'×4' or 2'×6' used as a mold when pouring slurry for the walls at the building site, thereby forming processed materials 26 according to the invention. Wood baseplate 30 is preferably redwood. Window 32 in window frame 34 can be employed. Panels 36 are nailed and/or bolted (e.g., via bolt holes 38) in place before the final wall cover is applied. A metal purlin or wood truss 40 is employed. If and where needed, tie brackets 42 can be employed for strength, on top, bottom, and/or sides.

FIGS. 3(a) to (e) are side, top, end, perspective, and assembled views of components 50 according to the invention attached via clips 56 (with cutaway views 54 of walls (preferably interior tip-up walls). Clip attachment points 52 are for straight wall clips on top or bottom with attachment points shown. Clips 56 are but one of many possible ways by which panels can be attached to each other and/or other components, such as steel braces, concrete flooring, and concrete walls. Each panel, whether in its mold frame or removed from its mold frame, will accept such clips. Other attachment means, such as nails, bolts, staples, etc., can be employed.

Figure 4:
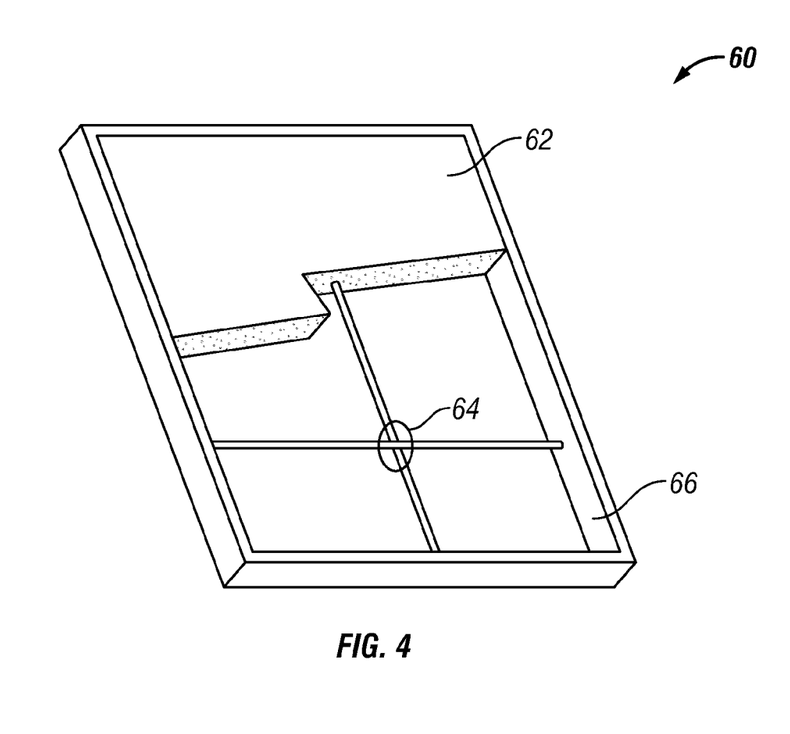
FIG. 4 is a schematic diagram of filler material according to the invention used in conjunction with rebar.

FIG. 4 is a schematic diagram of filler material 62 according to the invention used in conjunction with rebar 64, and optionally in frame 66, to form panel 60.

Figure 5A:
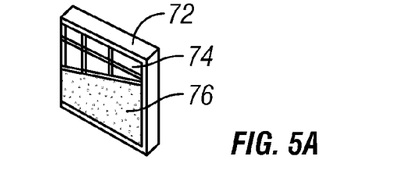
FIGS. 5(a) to (c) are schematic diagrams of use of "blown in" insulation with walls made according to the invention.
Figures 5B, 5C:
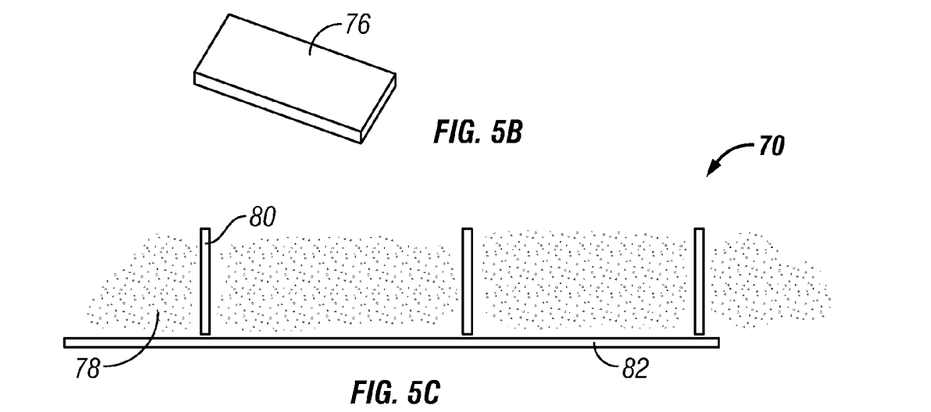

FIGS. 5(*a*) to (*c*) are schematic diagrams of use of "blown in" insulation with walls 70 made according to the invention. As illustrated, a slurry mix or shredded material can be placed in molds of any shape, size, or material to be included as part of the resulting product or, once poured in a form, left to dry by any method, and then taken from the mold to be handled from that point to its next step in its processing for its final form. Insulation can be made after the material is dried and then put in a machine to create the cellulose type product of the invention. Filler material 76 is preferably dried and stamped with a pattern. Wood frame 72 and rebar 74 are preferably employed, with blown-in insulation 78, wood or steel trusses 80, and dry wall or drop-in ceiling 82.

Figure 6A:
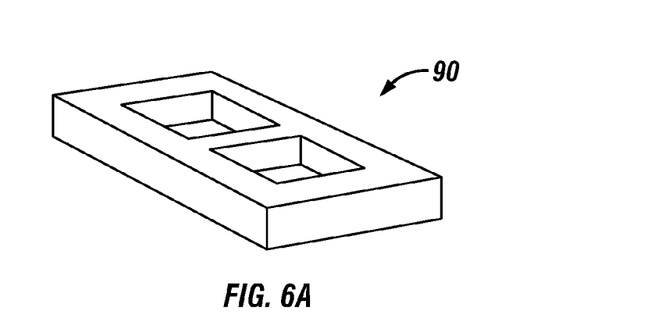
FIGS. 6(a) and (b) are top perspective views of molds useful with the invention.
Figure 6B:
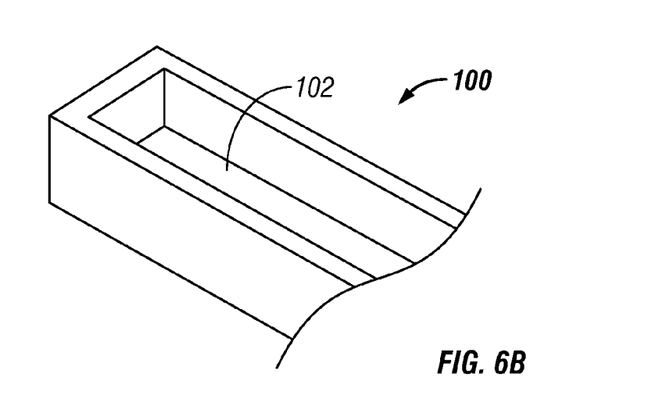
Figure 7:
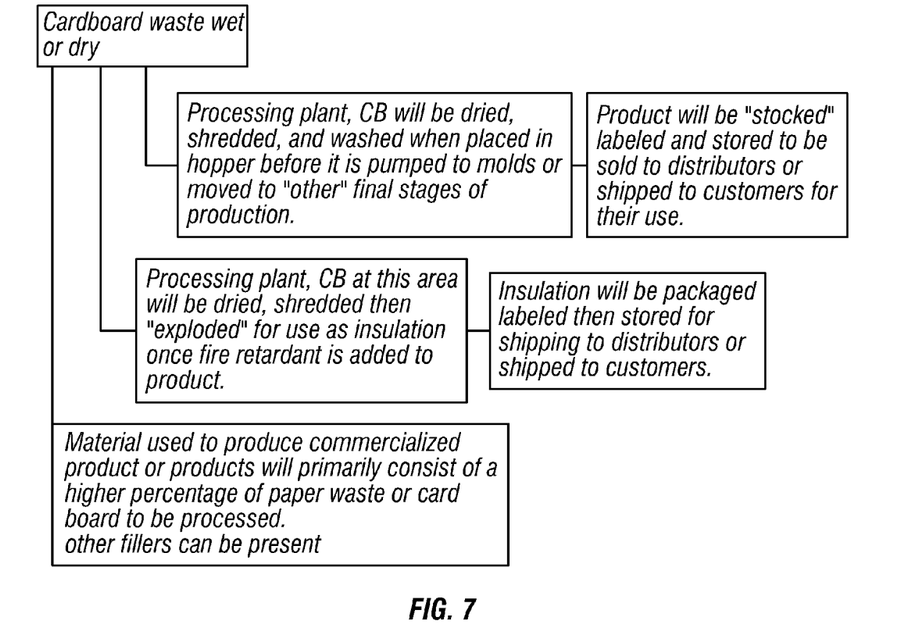
FIG. 7 is a flow diagram of uses of waste cardboard according to the invention.
Figure 8A:
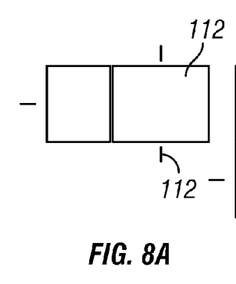
FIGS. 8(a) to (c) are views of a corner wall clip according to the invention.
Figures 8B, 8C:
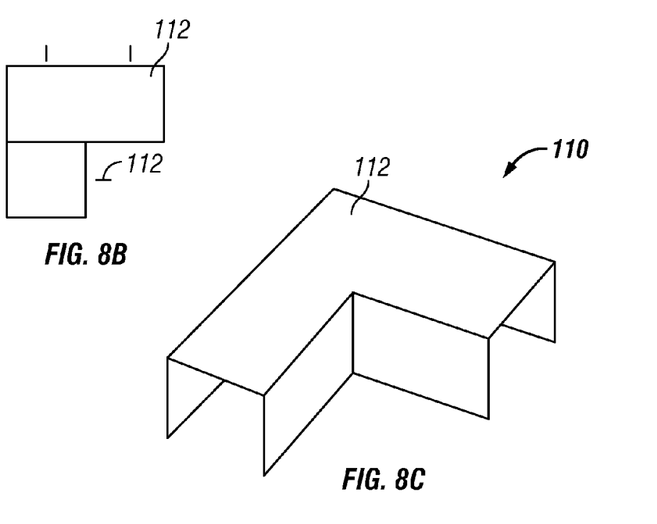

FIGS. 6(*a*) and (*b*) are top perspective views of molds 90,100 useful with the invention. FIG. 7 is a flow diagram of uses of waste cardboard according to the invention. FIGS. 8(*a*) to (*c*) are views of a corner wall clip 110 according to the invention, useful either on tops or bottoms during installation.

Figure 9A:
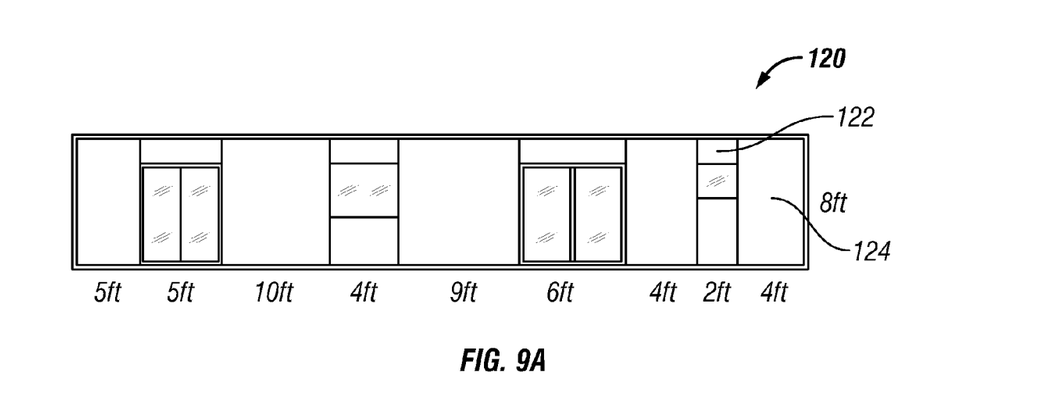
FIGS. 9(a) and (b) illustrate panel and block embodiments of walls according to the invention.
Figure 9B:
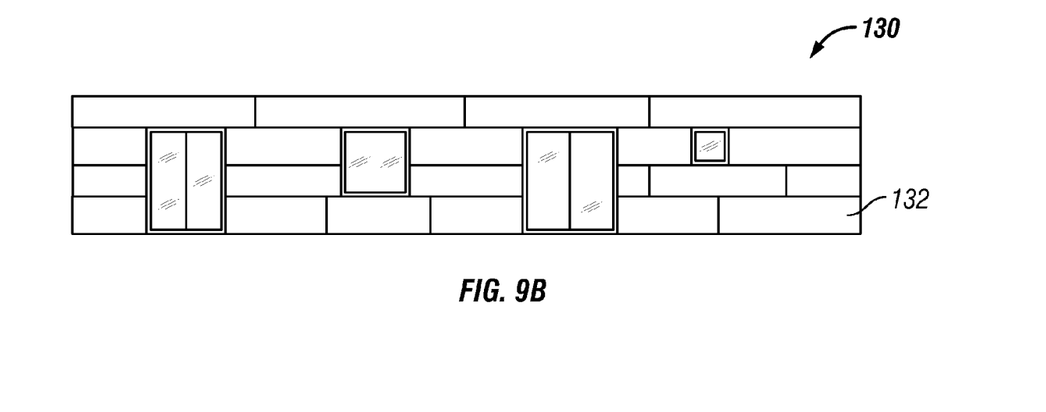
Figure 10A:
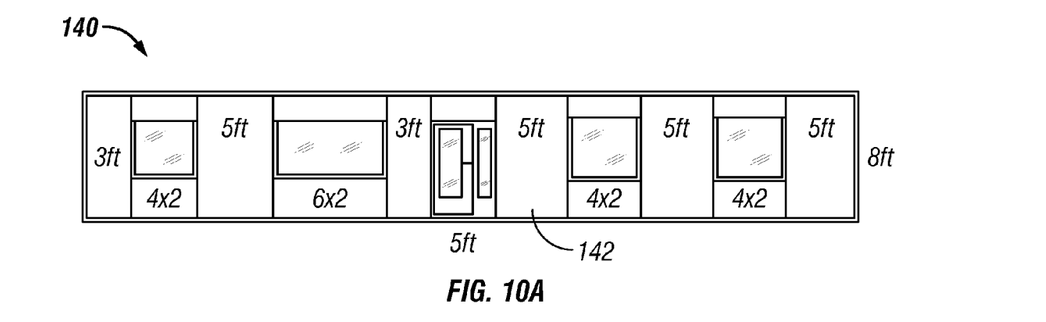
FIGS. 10(a) to (c) are further examples of walls made according to the invention.
Figure 10B:
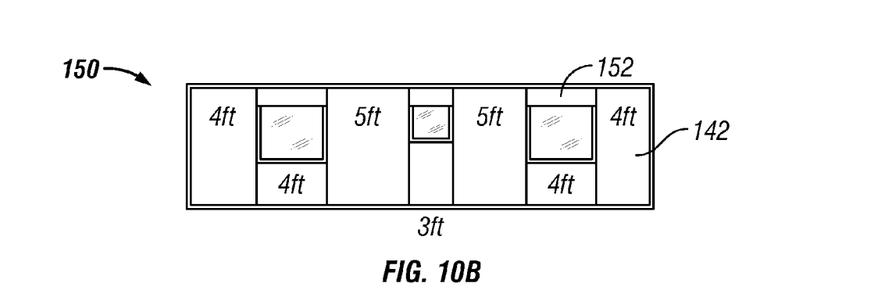
Figure 10C:
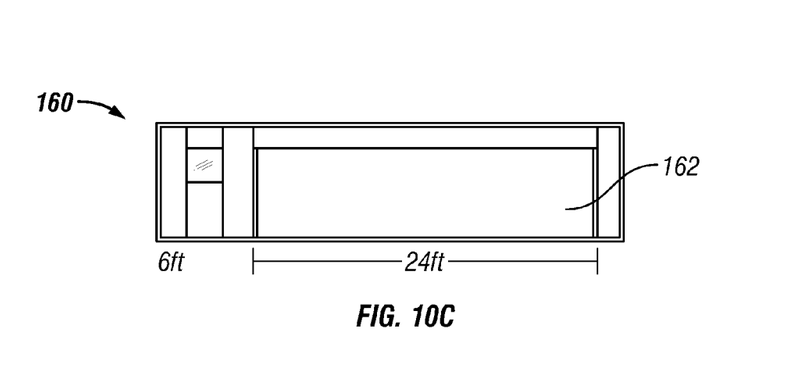

FIGS. 9(*a*) and (*b*) illustrate panel and block embodiments of walls 120,130 according to the invention, with wood headers 122, wall panels 124, and molded blocks 132. FIGS. 10(*a*) to (*c*) are further examples of walls 140,150,160 made according to the invention, including headers 152 (wood or material of the invention), wall sections 142, and garage door 162.

Note that in the specification and claims, "about" or "approximately" means within twenty percent (20%) of the numerical amount cited. Note further that plastic waste (or other, preferably non-hazardous, waste, preferably shredded) can be incorporated as a strand reinforcement for structural components of the invention.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of making a building structure comprising a plurality of structural components comprising load-bearing blocks, the method comprising the steps of mixing together press cake, water, bentonite clay, and calcium chloride, forming the mixture into the structural components; and using the structural components to form the building structure.

2. The method of claim 1 wherein the mixture consists essentially of press cake, water, bentonite clay, and calcium chloride.

3. The method of claim 1 wherein the mixture consists of press cake, water, bentonite clay, and calcium chloride.

4. The method of claim 1 wherein the forming step comprises employing a wire screen.

5. The method of claim 1 additionally wherein the forming step comprises employing rebar.

6. The method of claim 1 wherein the forming step comprises employing interlocking blocks.

7. The method of claim 1 wherein the mixing step additionally comprises mixing in one or both of borax and boric acid.

8. The method of claim 7 wherein the mixture consists essentially of press cake, water, one or both of borax and boric acid, bentonite clay, and calcium chloride.

9. The method of claim 1 wherein the bentonite clay comprises about 10% of the structural component by volume.

10. The method of claim 1 wherein the calcium chloride comprises about 10% of the structural component by volume.

11. The method of claim 1 wherein the press cake comprises recycled paper or cardboard.

\* \* \* \* \*